Patented Aug. 26, 1924.

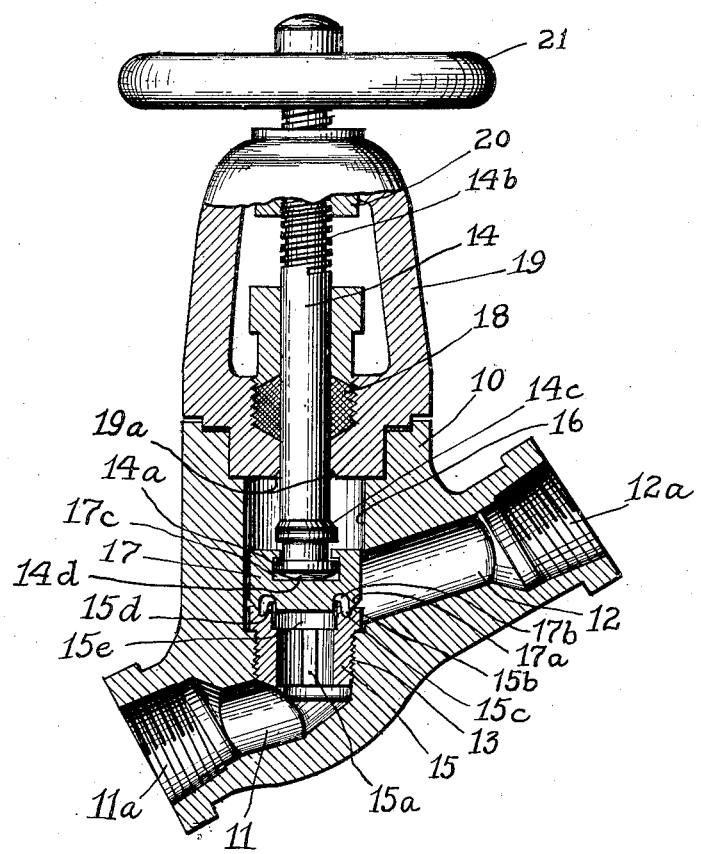

1,506,546

UNITED STATES PATENT OFFICE.

OLAF E. OLESON, OF EAST CHICAGO, INDIANA.

VALVE.

Application filed July 20, 1922. Serial No. 576,176.

*To all whom it may concern:*

Be it known that I, OLAF E. OLESON, a citizen of the United States, residing at East Chicago, in the county of Lake and State of Indiana, have invented a new and useful Improvement in Valves, of which the following is a specification.

My invention relates to an improved valve construction in which co-operating valve members are provided in the structure having seats engaging each other and co-operating parts on said members for interrupting the major portion of the fluid flow before the valve seats engage each other and for causing cleaning of the valve seats by the fluid during the closing operation, one of said members being preferably formed so as to assist in preventing leakage to and around the operating stem. My present invention is intended particularly for use to control the flow of liquids, such for example as water, under high pressure and the valve members are preferably so formed that when the valve seats are in engagement with each other, the liquid pressure held by the closed condition of the valve operates on parts of the valve members tending to hold the seats positively in engagement with each other by the pressure of the liquid which at this time acts upon the valve members.

My invention will best be understood by reference to the accompanying drawing showing a preferred embodiment thereof and other objects of my invention will best be understood by reference to said drawing in which the valve casing is indicated at 10, said casing being provided with an inlet passageway 11 and an outlet passageway 12. The outer ends of the passageways 11 and 12 terminate in threaded connections 11ª and 12ª which are in line with each other, thus adapting the valve for use in a straight run of pipe. The passageways 11 and 12 are not in line with each other but are substantially parallel with each other and serve to direct the liquid to and from the valve members controlling its flow. The inner end of the passageway 11 opens into a threaded bore 13 extending in a direction oblique to the axis of the connections 11ª and 12ª, the axis of said bore being in the axis of the operating stem 14. The bore 13 receives the tubular valve member 15 which is externally threaded to engage the threads of said bore, the inner wall of the member being provided with lugs or slots 15ª to facilitate screwing the member in place against its shoulder by means of a proper tool. The upper end of the member 15 is provided with an annular valve seat 15ᵇ which is a portion of the surface of a cone having its base uppermost. Within the valve seat 15ᵇ radially, the member 15 is provided with an annular groove 15ᶜ extending below the valve seat and having preferably a rounded bottom and within the groove 15ᶜ the member 15 is provided with an upwardly extending flange 15ᵈ, the upper edge of said flange being considerably above the valve seat 15ᵇ. The inner surface of the flange 15ᵈ is formed by means of a counterbore 15ᵉ in the upper end of the member 15 as indicated.

The passageway 12 has extending from its inner end through the casing 10, a bore 16 of slightly larger diameter than the external diameter of the member 15 co-axial with the axis of said member, which bore 16 extends through the upper end of the casing 10. In the bore 16 a second valve member 17 is disposed, said valve member being cylindrical and fitting said bore with a sliding fit. The valve member 17 is of a height from the valve seat 15ᵇ to extend somewhat above the top of the inner end of the passageway 12 to prevent at all times flow from the passageway 12 through the upper end of the valve casing into the upper end of the bore 16, excepting such slight flow as might occur between the member 17 and the casing due to the fit of the parts. The member 17 has formed on its lower end an annular valve seat 17ª of the same conformation as the valve seat 15ᵇ to tightly engage the valve seat 15ᵇ when the valve is in its closed position. Within the valve seat 17ª the member 17 is provided with an annular upwardly extending groove 17ᵇ, the outer wall of which is substantially in line with the outer wall of the groove 15ᶜ and the inner wall of which is cylindrical and has a free sliding fit in the bore 15ᵉ, the bottom of said groove being preferably rounded as indicated, for a purpose to be described. The inner cylindrical portion of the member 17 projects sufficiently below the upper edge of the flange 15ᵈ to prevent all but a small flow of liquid between the valve members before the valve seats are brought close together.

The upper end of the valve member 17 is provided with a T-shaped slot 17ᶜ engaged by a corresponding head 14ᵃ on the lower end of the valve stem 14 and the valve stem 14, which is co-axial with the members 15 and 17, extends upwardly through a stuffing box 18 carried by the bonnet 19 employed to close the upper end of the bore 16 and to support the stem 14. The lower end of the rod 14 has a spherical conformation as shown at 14ᵈ for engaging the bottom of the groove 17ᶜ, there being sufficient play between the head 14ᵃ and the groove 17ᶜ to permit the motion of the disk 17 relatively to the rod 14, necessary to bring the valve seats into accurate engagement with each other on closing the valve. The upper end of the stem 14 is threaded as indicated at 14ᵇ to engage similar threads in the member 20 carried by the upper end of the bonnet and outside of the bonnet, the stem 14 has secured thereto a wheel 21 for turning the valve stem to operate the valve member 17. As a result of the construction described the mode of operation of the device and the advantage secured thereby will appear, as follows. When the valve is in its open condition the fit of the member 17 in the bore 16 materially assists in preventing escape of the liquid around the operating stem 14 which is further prevented by the inclined surface of the flange 14ᵉ on the rod engaging chamfer 19ᵃ in the lower end surface of the bonnet. The engagement between the flange 14ᵉ and the chamfer 19ᵃ also permits repacking the stuffing box 18 without leakage around the stem 14. During this condition the fluid has an uninterrupted path through the casing of the valve with little obstruction, since the flow of fluid through the valve is maintained as nearly as possible in a straight line between the inlet and outlet openings, thus adapting the valve for use in a straight run of pipe without special fittings. During the closing of the valve, the member 17 moves in the bore 16 across the inner end of the outlet passageway 12 and since said member fills the bore radially, the only path for liquid flow at this time is between the lower end of the member and the upper end of the flange 15ᵈ. When the lower face of the member 17 is nearly in line with the upper end of the flange 15ᵈ, the valve seats 15ᵇ and 17ᵃ are still separated an appreciable distance, which in some cases may be considerable, and for this condition the velocity of liquid flow between the flanges 17ᵃ and 15ᵈ is relatively great and any cutting or scoring which results is upon said flanges. This however is no detriment, since it is not necessary that there shall be an exact fit between said flanges; and for this condition no cutting or scoring ocurs at the valve seats since they are still separated a considerable distance. At this time the liquid flowing between the members 15 and 17 is directed by the grooves 15ᶜ and 17ᵇ against the valve seats to remove from them any foreign matter that may have settled on them and to prevent the lodging of foreign matter on the valve seats while they are being brought into engagement with each other. The member 17 preferably fits with a free sliding fit the bore 15ᵉ, which permits a small flow between the members 15 and 17 when the member 17 has entered the bore 15ᵉ and before the valve seats are in engagement with each other. This quantity of flow, however, is but a small part of the previous uninterrupted flow of liquid through the valve and is not sufficient to damage the valve seats by cutting or scoring.

When by continued motion of the member 17 downwards the valve seats 15ᵇ and 17ᵃ are brought tightly into engagement with each other, the member 17 is still in the bore 16 across the inner end of the passageway 12, said bore serving to guide the member to secure proper engagement between the member 17 and 15ᵉ. Accurate engagement of the valve seats results from the centering action of the inclined faces of said seats and also from the engagement between the spherical end 14ᵈ with the bottom of the slot 17ᶜ permitting free motion of the disk 17 to bring the valve seats accurately into engagement with each other. The inclined faces of the valve seats preferably converge toward the inlet passageway and as a result, when the valve seats are firmly held together the pressure in the passageway 11 is communicated through the small clearance between the member 17 and the wall of the bore 15ᵉ into the grooves 17ᵇ and 15ᶜ and exerted upon the inner surface of the groove 17ᵇ adjacent the thin lower edge of the valve seat 17ᵃ and this pressure tends to expand the said thin edge and hold it more tightly in engagement with the valve seat 15ᵇ. It is to be noted that the higher the pressure is on the fluid, whether liquid or gaseous, being controlled by the valve, the greater will be the tendency of the pressure in the grooves 17ᵇ and 15ᶜ to expand the edge of the valve seat 17ᵃ for the closed condition of the valve. It will be observed that the engagement between the member 17 and the wall of the bore 15ᵉ serves to center the member 17 relatively to the member 15 to bring the valve seats 17ᵃ and 15ᵇ into proper relation to each other and that when these valve seats engage each other on account of their being each a part of the surface of a cone, the engagement of the valve seats accurately centers the movable valve seat in the fixed valve seat which would not be the case if the valve seats or either of them were disposed in a plane perpendicular to the axis of the valve members. It will be understood, that while the valve members are shown in connection with a casing having connections in axial alignment with each other, the same construction and operation of said valve members may be employed in any desired type of casing since the type of casing does not constitute an essential part of my invention. It will also be understood that where desired to meet the requirements of any case, the passageways 11 and 12 may be respectively the outlet and inlet passageways.

While I have shown my invention in the particular embodiments above described it will be understood that I do not limit myself to this exact construction but that I may employ equivalents known to the art at the time of the filing of this application without departing from the scope of the appended claims.

What I claim is:

1. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat, an annular flange and a groove between said seat and flange, said casing having a bore co-axial with the axis of said first member, and said second member being cylindrical and fitting said bore, the second one of said members having an annular inclined valve seat and a cylindrical projection for co-operation with the flange on said first member to interrupt the major part of the flow before engagement of the valve seats with each other and leaving sufficient flow across said valve seats to keep them clean during closing, there being a slight clearance between said valve members and said valve seats converging towards the inlet passageway whereby the pressure in the inlet passageway is communicated to said clearance and said groove when said valve seats are closed and tends to expand one of said seats against the other to hold them tightly in engagement with each other.

2. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat and an annular flange, said casing having a bore co-axial with the axis of said first member and the second one of said members being cylindrical and fitting said bore, said second member having an annular inclined valve seat and a cylindrical projection for co-operation with the flange on said first member to interrupt the major part of the flow before engagement of the valve seats with each other and leaving sufficient flow across said valve seats to keep them clean during closing, there being a clearance between the valve seat of the said first member and its flange and between the valve seat and cylindrical projection of the said second member and said valve seats converging towards the inlet passageway whereby the pressure in the inlet passageway is communicated to said clearance when said valve seats are closed and tends to expand one of said seats against the other to hold them tightly in engagement with each other.

3. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat, an annular flange and a groove between said seat and flange, said casing having a bore co-axial with the axis of said first member, and the second one of said members being cylindrical and fitting said bore, said second member having an annular inclined valve seat and a cylindrical projection for co-operation with the flange on said first member to interrupt the major part of the flow before engagement of the valve seats with each other and leaving sufficient flow across said valve seats to keep them clean during closing, there being a slight clearance between said valve members and said valve seats converging towards the inlet passageway whereby the pressure in the inlet passageway is communicated to said clearance and said groove when said valve seats are closed and tends to expand one of said seats against the other to hold them tightly in engagement with each other, said second member having an annular groove between its seat and cylindrical projection registering with the groove in said first member.

4. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat, an annular flange and a groove between said seat and flange, said casing having a bore co-axial with the axis of said first member, and the second one of said members being cylindrical and fitting said bore, said second member having an annular inclined valve seat and a cylindrical projection for co-operation with the flange on said first member to interrupt the major part of the flow before engagement of the valve seats with each other and leaving sufficient flow across said valve seats to keep them clean during closing, said valve seats converging towards said inlet passageway.

5. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat, an annular flange and a groove between said seat and flange, said casing having a bore co-axial with the axis of said first member, and the second one of said members being cylindrical and fitting said bore, said second member having an annular inclined valve seat and a cylindrical projection for co-operation with the flange on said first member to interrupt the major part of the flow before engagement of the valve seats with each other and leaving sufficient flow across said valve seats to keep them clean during closing, there being a slight clearance between said valve members and said valve seats converging towards the inlet passageway whereby the pressure in the inlet passageway is communicated to said clearance and said groove when said valve seats are closed and tends to expand one of said seats against the other to hold them tightly in engagement with each other, said moving means including an operating rod having a spherical end for engaging the movable valve member, whereby the movable valve member may rock on said spherical end to accurately engage the other valve member.

6. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat and an annular flange, said casing having a bore co-axial with the axis of said first member, and the second one of said members being cylindrical and fitting said bore, said second member having an annular inclined valve seat and a cylindrical projection for co-operation with the flange on said first member to interrupt the major part of the flow before engagement of the valve seats with each other and leaving sufficient flow across said valve seats to keep them clean during closing, there being a clearance between the valve seat of the said first member and its flange and between the valve seat and cylindrical projection of the said second member and said valve seats converging towards the inlet passageway whereby the pressure in the inlet passageway is communicated to said clearance when said valve seats are closed and tends to expand one of said seats against the other to hold them tightly in engagement with each other, said moving means including an operating rod having a spherical end for engaging the movable valve member, whereby the movable valve member may rock on said spherical end to accurately engage the other valve member.

7. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat, an annular flange and a groove between said seat and flange, said casing having a bore co-axial with the axis of said first member and the second one of said member being cylindrical and fitting said bore, said second member having an annular inclined valve seat and a cylindrical projection for co-operation with the flange on said first member to interrupt the major part of the flow before engagement of the valve seats with each other and leaving sufficient flow across said valve seats to keep them clean during closing, there being a slight clearance between said valve members and said valve seats converging towards the inlet passageway whereby the pressure in the inlet passageway is communicated to said clearance and said groove when said valve seats are closed and tends to expand one of said seats against the other to hold them tightly in engagement with each other, said second member having an annular groove between its seat and flange registering with the groove in said first member, said moving means including an operating rod having a spherical end for engaging the movable valve member, whereby the movable valve member may rock on said spherical end to accurately engage the other valve member.

8. In a valve, the combination of a casing having inlet and outlet passageways, two valve members co-operating to establish and interrupt communication between said passageways as desired, and means for moving one of said members towards and away from the other of said members, a first one of said members being tubular and rigidly mounted in said casing in communication with one of said passageways and having an annular inclined valve seat, an annular flange and a groove between said seat and flange, said casing having a bore co-axial with the axis of said first member, and the second one of said members being cylindrical and fitting said bore, said second member having an annular inclined valve seat and a cylindrical projection for co-operating with the flange on said first member to interrupt the major part of the flow before engagement of the valve seats with each other and leaving sufficient flow across said valve seats to keep them clean during closing, said valve seats converging towards said inlet passageway, said moving means including an operating rod having a spherical end for engaging the movable valve member, whereby the movable valve member may rock on said spherical end to accurately engage the other valve member.

In witness whereof, I hereunto subscribe my name this 11th day of July, A. D. 1922.

OLAF E. OLESON.